May 29, 1962
G. M. SPEAR
3,036,364
ALTERNATE BLADE FACE MILL CUTTER FOR
SPIRAL BEVEL AND HYPOID GEARS
Filed Aug. 26, 1959
2 Sheets-Sheet 1
FIG. 1
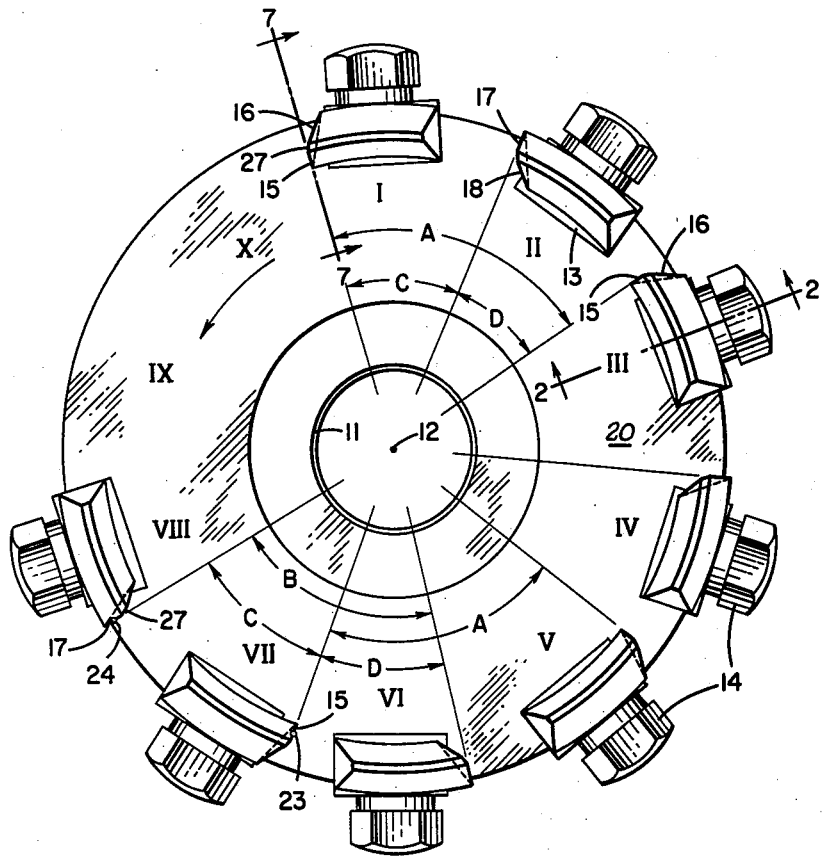
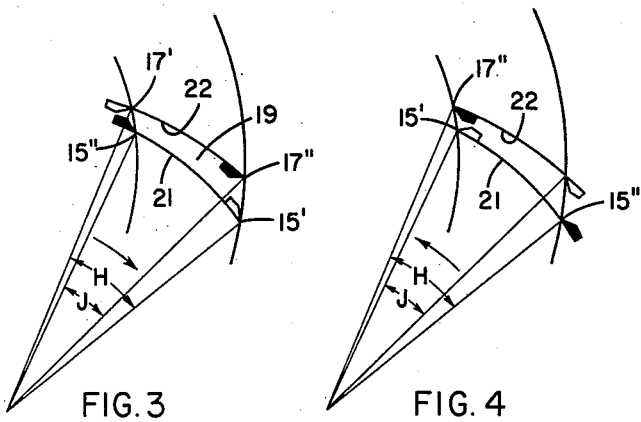
FIG. 3    FIG. 4
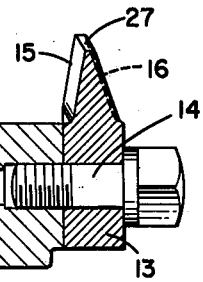
FIG. 2
INVENTOR.
GILMORE M. SPEAR
BY
Richard W. Treverton
ATTORNEY

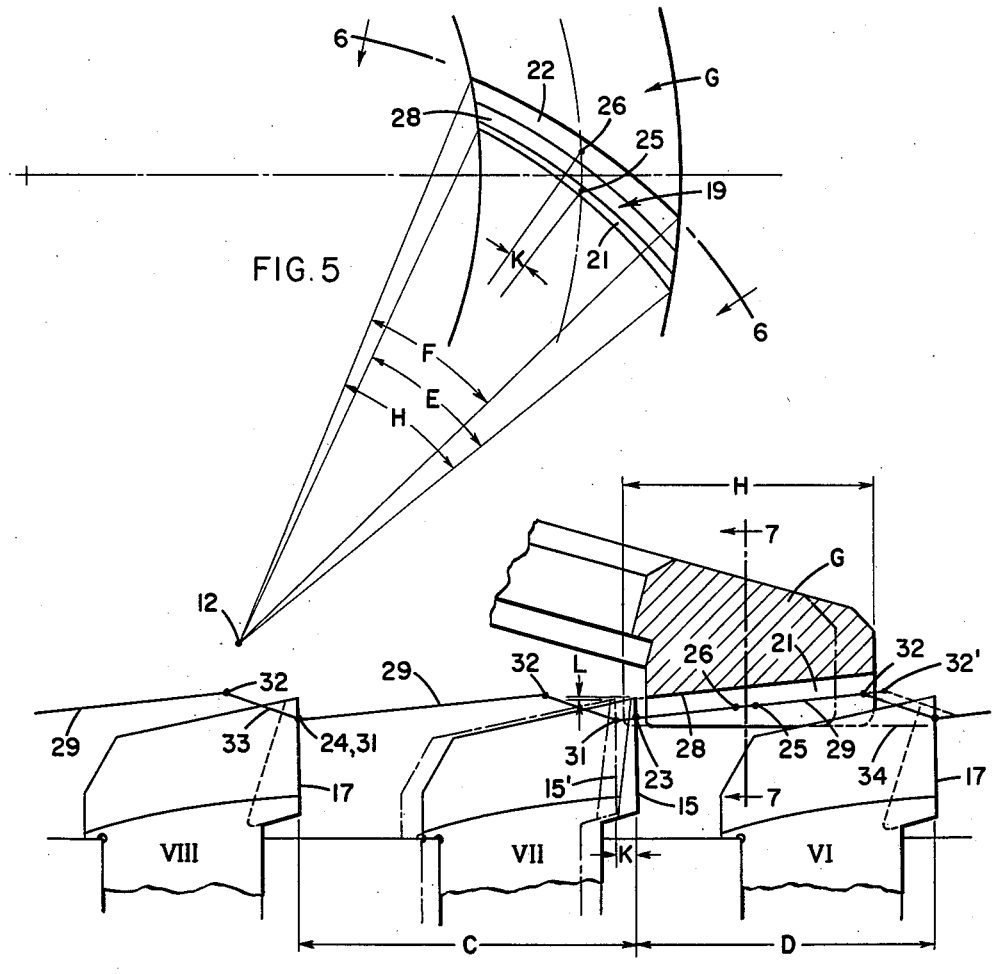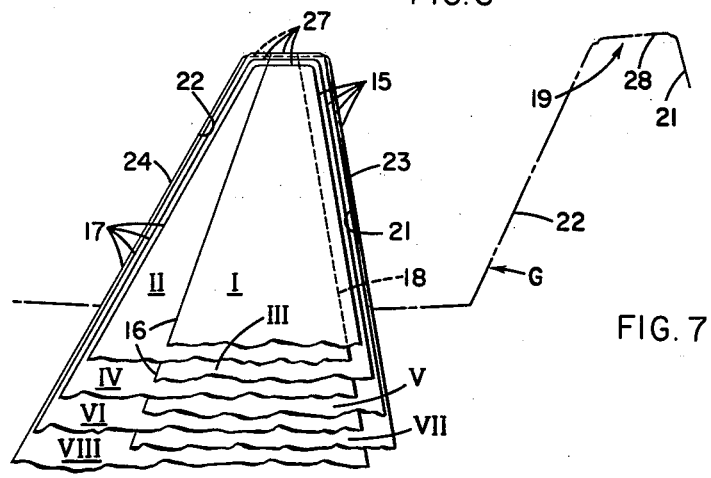

United States Patent Office 3,036,364
Patented May 29, 1962

3,036,364
ALTERNATE BLADE FACE MILL CUTTER FOR SPIRAL BEVEL AND HYPOID GEARS
Gilmore M. Spear, Rochester, N.Y., assignor to The Gleason Works, Rochester, N.Y., a corporation of New York
Filed Aug. 26, 1959, Ser. No. 836,097
8 Claims. (Cl. 29—105)

The present invention relates to face mill cutters of the alternate blade type for cutting spiral bevel and hypoid gears by the intermittent indexing method.

It has long been known that smoother and more accurate tooth surfaces are obtained if only one instead of a plurality of cutter blades is in the cut at a time. This however restricts the number of blades that can be gotten into a cutter, since for a gear of given design the cutter diameter is limited. The number of blades is further restricted in cutters of the type wherein an indexing gap is provided between the last and first blades, as shown in McMullen et al. Patent 2,125,943. The resulting restriction in number of blades is particularly onerous in cutters of this general kind adapted for cutting by the method disclosed in application Serial No. 705,931, filed December 30, 1957, by L. O. Carlsen and C. B. King, where there is an axial infeed of the cutter while each blade cuts, followed by an axial return motion which is completed before the next blade cuts, thus requiring an event wider spacing of the blades than is shown in Patent 2,125,943.

The object of the present invention is to increase the number of blades which can be provided in a cutter of any one of the aforementioned types, or conversely, to permit such a cutter, of given diameter and number of blades, to cut a gear of greater angular face width than has heretofore been possible, while adhering to the condition that there be only one blade at a time in the cut.

The invention will be described in detail with reference to the accompanying drawings, of a cutter adapted to cut by the method disclosed in the aforementioned application Serial No. 705,931, wherein:

FIG. 1 is a front view of the cutter;

FIG. 2 is a fragmentary section, taken in plane 2—2 of FIG. 1;

FIGS. 3 and 4 are diagrams illustrating differences in blade spacing requirements;

FIG. 5 is a fragmentary view of a work gear as viewed in a plane perpendicular to the cutter axis, showing certain angular relationships between the axis and a tooth slot of the gear;

FIG. 6 is a plane development of the curved section 6—6 of FIG. 5, showing certain relationships between the cutter blades and the work gear; and, FIG. 7 is an enlarged fragmentary schematic view showing the relationships of the several cutting blades to each other, assuming them to be rotated to project their front faces into a single plane containing the cutter axis, such as the planes designated 7—7 in FIGS. 1 and 6.

The cutter comprises a circular head 20 having a central tapered bore 11 adapting it for mounting on the cutter spindle of a gear cutting machine for rotation with the spindle about axis 12. A plurality of cutting blades designated I to VIII, inclusive, are arranged around the periphery of the head, each blade having a shank 13 secured in a slot in the head by a holding screw 14 and having its cutting portion projecting in a generally axial direction from the front face of the head. Blades I, III, V and VII are inside-cutting blades, having their front faces so sharpened as to present inside-cutting edges 15 and non-cutting or clearance outside edges 16, while the alternate blades, II, IV, VI and VIII, are sharpened for outside cutting, their side-cutting edges being designated 17 and their clearance side edges 18.

The illustrated cutter is for finish cutting gears which have previously been rough cut and hence successive blades are offset radially, as shown in FIG. 7, so that each will take only a thin layer of stock from the work gear. The amount of offset is greatly exaggerated in FIG. 7. In practice the edges 15 of blades I, III and V are so offset that the distance between them, as measured perpendicularly to them in the plane of the view, is on the order of two to five thousandths of an inch (0.002"–0.005"), while the distance between edges 15 of blades V and VII may be about one to two thousandths of an inch. The same magnitudes of offset exist between blades II to VIII as between blades I to VII.

On each revolution of the cutter all of the blades cut in the same tooth slot 19 of a spiral bevel or hypoid work gear G and hence the cutting edges 15 and 17 are spaced radially from each other by such distance that they will respectively cut the convex side 21 and the concave side 22 of the tooth slot 19. That is, points 23 and 24 of respective edges 15 and 17, which cut at the depth of the mean points 25 and 26, FIGS 5 and 6, on the tooth sides 21 and 22, are spaced radially from each other by approximately one-half of the mean circular pitch of the gear being cut, as shown in FIG. 7. The blades I, III and V and the blades II, IV and VI are of progressively increasing effective height, as their tip edges 27 may be required to cut on the bottoms of the tooth slots near the sides of the slots even though the slots have been roughed out in a preceding roughing operation. The blades VII and VIII are preferably of slightly smaller effective height than preceding blades V and VI, to prevent them from bottom cutting.

The inside-cutting blades are spaced by equal angles A about the axis 12, each such angle, measured from one cutting edge 15 to the next, being the dividend of three hundred sixty degrees divided by a number equal to the number of inside-cutting blades plus one, or seventy-two degrees in the case illustrated. The cutting-edge to cutting-edge angular spacing B of the several outside-cutting blades is also equal, the spacing angle being designated B and being equal to angle A. A gap between the last blade VIII and the first blade I, constituted by omitted-blade spaces IX and X, is provided to enable the work gear to be indexed, without cessation of cutter rotation, each time the gap comes abreast of the gear.

Heretofore the practice has been to make the blade to blade angular spacing equal in cutters of the kind concerned here, i.e. alternate blade cutters for use in the intermittent indexing method of producing gears. That is the angles C, FIG. 1, between the inside-cutting edges 15 and the immediately following outside edges 17, have been equal to the angles D, between the outside-cutting edges 17 and the immediately following inside edges 15. According to the present invention I make them unequal, making C larger than D, which I have found has great practical advantage, as will now be explained.

Referring to FIG. 5 it will be seen that the angular extent about cutter axis 12 of the convex tooth side 21, designated angle E, is slightly greater than the angular extent, angle F, of the concave side 22, but that these angles are both considerably smaller than angle H which respresents the total angular extent of tooth slot 19. In order to have only one blade at a time in the slot it was therefore necessary, according to the prior practice, to space the blades by at least the angle H. That is angles C and D were equal, and both of them were greater than angle H. According to the present invention this equality is eliminated, and the angle D is made substantially smaller than angle C.

Referring to the diagram, FIG. 3, which illustrates a case where the cutter cuts from the inner to the outer end of the tooth slot 19, it will be seen that the inside cutting edge 15' is spaced by angle H from the next following outside cutting edge 17', and this angle is the minimum for angle C which will meet the condition of only one blade at a time in the slot. On the other hand, to meet this same condition, the outside cutting edge 17" need be spaced from the next following inside cutting edge 15" by the smaller angle J.

By reference to the diagram, FIG. 4, it will be seen that the order of wide and narrow angular spacing should be reversed if the direction of cutting is reversed so as to be from the outer to the inner end of the tooth slot. In this case the outside cutting edge 17'' must be spaced by at least the larger angle H from the immediately following inside-cutting edge 15'', while the inside-cutting edge 15' may be spaced by the smaller angle J from the next following outside cutting edge 17'.

Accordingly, in a cutter of the present invention intended for conventional cutting from the inner to the outer ends of the tooth slots the angle C may be made only slightly greater than angle H, and angle D only slightly greater than angle J, while for reverse direction cutting the values of angles C and D are reversed.

The cutter of FIGS. 1 and 6 is for cutting in the direction of FIG. 3, and, as before stated, by the method of application Serial No. 705,931 wherein a feed motion between the cutter and work gear, in the direction of the cutter axis, occurs as each blade cuts, and is followed by a more rapid return motion between cuts. As there are ten blade spaces around the cutter (although only eight actual blades), there are ten axial reciprocations for each revolution of the cutter, each extending over thirty-six degrees of cutter rotation. Of this thirty-six degrees slightly more than three-quarters is devoted to the axial feed motion and the remainder to the axial return motion. During the feed motion point 24 on each blade cutting edge 17 follows a path 29 extending from a point 31 to the right (in FIG. 6) to a point 32, and during each return stroke follows a path 33 from a point 32 to the right to the next point 31. By this method of cutting, the cutter axis 12 may be positioned substantially perpendicular to the face plane 34 of the gear although the blades cut along path 29 parallel to the tooth slot bottom 28. The paths 29 and 33 are helices coaxial with cutter axis 12. The angular extent, about the cutter axis, of each path 29, i.e. the horizontal distance from each point 31 to the point 32 to the right thereof, is less than the angular extent H of the particular gear G that is illustrated, so that with a conventional cutter having equally spaced blades the gear could not be cut across its full face width.

In the cutter of the present invention the inside blades are moved ahead from a position of equal blade spacing approximately by the angle K through which the mean points 25 and 26 of the respective tooth sides 21 and 22 are offset from each other about the cutter axis. That is, each inside-cutting blade instead of being placed in the broken line position in FIG. 6, wherein its cutting edge 15' would be equidistant from the two adjacent outside cutting edges 17, is placed in the full line position shown. As a result the effective feed path 29 for the inside-cutting blade extends to position 32', FIG. 6, making it possible for the cutter to cut the gear across its full face width, angle H. It will be seen that if the same gear G were to be cut with a cutter having the conventional equal blade spacing, it would be necessary to increase the blade spacing, with resultant decrease in the number of blades in the cutter and in the number of feed reciprocations per cutter rotation. That is it would be necessary to reduce the number of blades from eight to six, and the number of reciprocations from ten to eight, with a resulting increase in chip thickness and a great reduction in cutter life and quality of surface finish of the gears.

In order that the inside-cutting blades will cut to the same depth as the outside-cutting blades they are advanced axially with respect to the latter by the distance L, FIG. 6, so that their mean points 23 will remain along a path 29.

In cases where the tooth bearing, or area of contact between mating gear teeth, is localized by making the paths 28 helices of varying axial lead, as disclosed in aforementioned application Serial No. 705,931, and where the same variation in lead is employed for every feed motion, the effect of the offset angle K, FIG. 5, is to locate the tooth bearing nearer to the outer end of the gear teeth on their concave sides than on their convex sides. Such unbalance is obviated by the present cutter.

Having now described a preferred embodiment of my invention, and the operation thereof, what I claim is:

1. A face mill cutter for cutting a spiral bevel or spiral hypoid gear by the intermittent indexing method, said cutter having alternate inside-cutting and outside-cutting blades, with the outside-cutting blades outset radially from the inside-cutting blades by the amount necessary to enable them to cut the concave side of a tooth slot during the same revolution of the cutter in which the inside-cutting blades cut the convex tooth sides of the same slot, the spacing of adjacent blades angularly about said axis being so related to the angular face width of the gear being cut that only one blade can cut at a time, the angular spacing of the inside-cutting blades from each other, and also that of the outside-cutting blades from each other, from the first to the last in the order of cutting being equal, the cutter being further characterized in that the angular spacing between the inside cutting blades and the adjacent outside cutting blades, as measured from one side-cutting edge to the next around the cutter in one direction, is greater than the angular spacing between the outside-cutting blades and the adjacent inside-cutting blades, to compensate for the angular offset about the cutter axis of the convex and concave sides of the tooth slot.

2. A cutter according to claim 1 in which the magnitude of the difference in angular blade spacing is approximately twice the angular offset of the convex and concave sides of the tooth slot.

3. A cutter according to claim 1 arranged to cut from the outer to the inner end of the tooth slot, characterized in that said one direction is the direction of rotation for cutting.

4. A cutter according to claim 1 arranged to cut from the inner to the outer end of the tooth slot, characterized in that said one direction is counter to the direction of rotation for cutting.

5. A cutter according to claim 1 in which successive inside-cutting blades, except the last and first, are spaced from each other by an angle equal to three hundred sixty degrees divided by a number that is greater by one than the number of inside-cutting blades, and successive outside-cutting blades, except the last and the first, are also spaced from each other by said angle, the space between the last and first blades constituting an indexing gap.

6. A cutter according to claim 1 for cutting by a method wherein a relative feed in the direction of the cutter axis is effected between the cutter and work gear as each blade cuts, whereby each blade while cutting follows a helical path of constant radius, characterized in that the alternate blades which are spaced at the greater angle from their respective preceding blades, as measured around the cutter in the direction of rotation for cutting, are advanced axially relative to said preceding blades.

7. A cutter according to claim 6 in which the magnitude of said axial advance is such that the advanced blades would be brought to the same effective level as the other blades by displacing them about and along the cutter axis, in a helical path of the same axial lead as the aforementioned helical path, to a position wherein the angular spacing of the blades would be equal.

8. A face mill cutter for cutting a spiral bevel or spiral hypoid gear by an intermittent indexing method wherein a relative feed in the direction of the cutter axis is effected between the cutter and work gear as each blade cuts, whereby each blade while cutting follows a helical path of constant radius, and wherein cutter rotation is continuous, with the intermittent indexing of the work gear occurring when a gap between the last and first blades of the cutter is abreast of the work gear, said cutter having alternate inside-cutting and outside-cutting blades, with the outside-cutting blades outset radially from the inside-cutting blades by the amount necessary for them to cut the concave side of a tooth slot during the same revolution in which the inside-cutting blades cut the convex side of the same slot, successive inside-cutting blades, except the last and first, being spaced from each other by an angle equal to three hundred sixty degrees divided by a number that is greater by one than the number of inside blades, and successive outside-cutting blades, except the last and the first, also being spaced from each other by said angle, the space between the last and first blades of the cutter constituting the indexing gap, the cutter being further characterized in that the angular spacing of each inside-cutting blade from the next outside-cutting blade, as measured from one side-cutting edge to the next around the cutter in one direction, is greater than the angular spacing of each outside-cutting blade from the next inside cutting blade, to compensate for the angular offset about the cutter axis of the convex and concave sides of the tooth slot, and that the alternate blades which are spaced at the greater angle from their respective preceding blades, as measured around the cutter is in the direction of rotation for cutting, are axially advanced relative to said preceding blades, the magnitude of the advance being such that the advanced blades would be brought to the same effective level as the other blades by displacing them about and along the cutter axis, in a helical path of the same axial lead as the aforementioned helical path, to a position wherein the angular spacing of the blades would be equal.

References Cited in the file of this patent
UNITED STATES PATENTS 2,125,943    McMullen _____ Aug. 9, 1938
2,974,399    King _____ Mar. 14, 1961